United States Patent [19]

Allen

[11] 4,063,258

[45] Dec. 13, 1977

[54] SPOTLIGHT MOUNTED CAMERA FOR VEHICLES

[76] Inventor: Robert H. Allen, 2206 Prospect St., La Crosse, Wis. 54601

[21] Appl. No.: 705,587

[22] Filed: July 15, 1976

[51] Int. Cl.² .................... G03B 15/02; G03B 29/00
[52] U.S. Cl. .................................... 354/81; 352/132; 354/126
[58] Field of Search .................... 354/75–77, 354/81, 126, 220, 165, 64; 240/1.3, 2 C; 352/132

[56] References Cited

U.S. PATENT DOCUMENTS

| | | | |
|---|---|---|---|
| 2,464,067 | 3/1949 | Baker | 354/81 |
| 3,783,261 | 1/1974 | Hartmann | 240/1.3 |

*Primary Examiner*—John Gonzales

*Attorney, Agent, or Firm*—Williamson, Bains, Moore & Hansen

[57] ABSTRACT

A combined vehicular spotlight and camera assembly. In a preferred form the invention comprises a housing adapted to be attached to the vehicle roof, a spotlight disposed internally of the housing to illuminate an object to be photographed and a camera associated with the spotlight and simultaneously aimed therewith. Appropriate linkage for controlling the apparatus extends into the vehicle through an appropriate orifice in the vehicle roof. Means are provided for remotely actuating the camera shutter and film advance mechanisms. In an alternate form of this invention a camera is associated with an externally located, door post-mounted spotlight, operated simultaneously therewith through linkage extending into the vehicle interior.

8 Claims, 5 Drawing Figures

U.S. Patent  Dec. 13, 1977  4,063,258
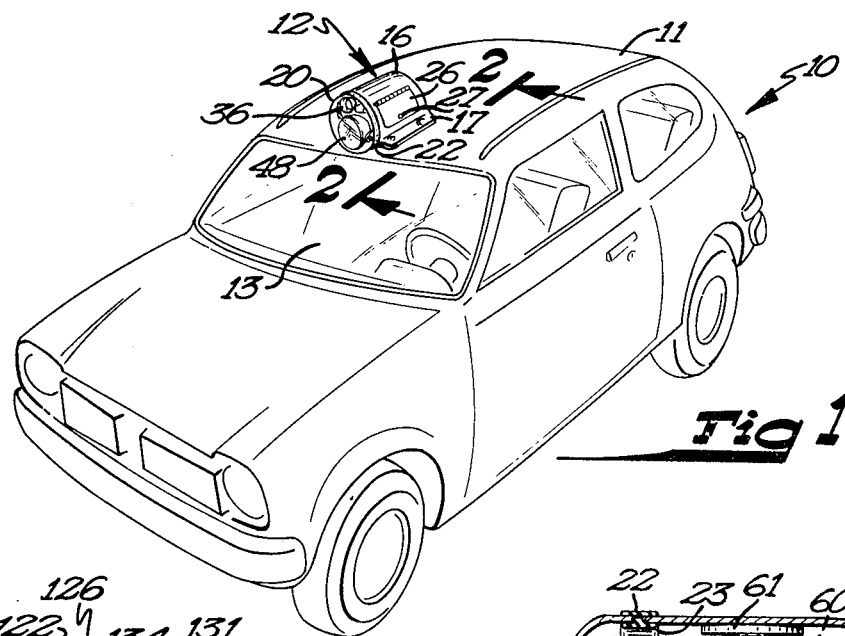
Fig 1
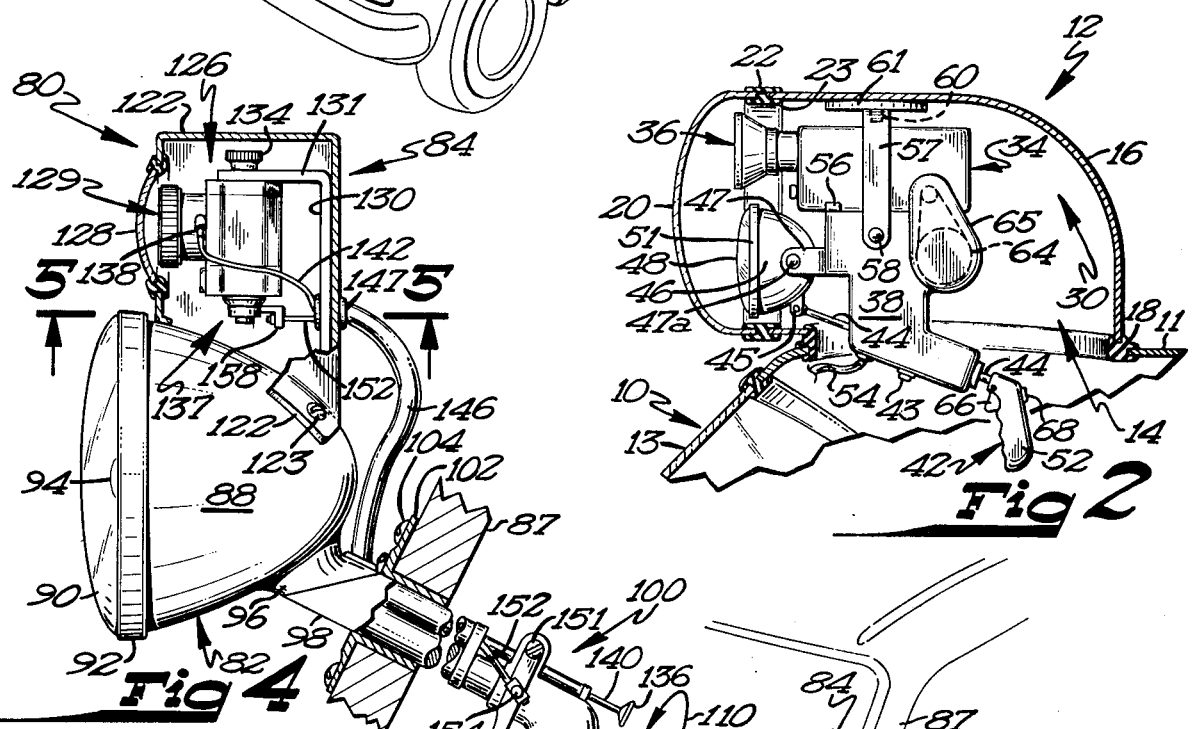
Fig 2
Fig 4
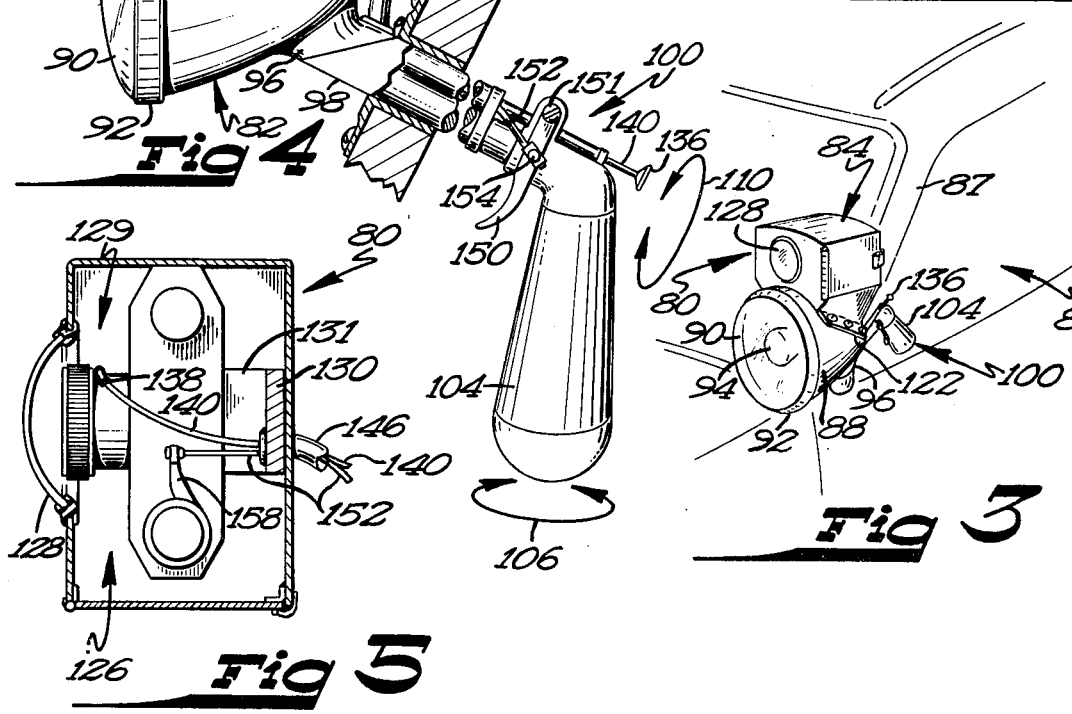
Fig 3
Fig 5

SPOTLIGHT MOUNTED CAMERA FOR VEHICLES

BACKGROUND OF THE INVENTION

This invention relates generally to photography. More particularly, the present invention relates to a remotely controlled spotlight and camera assembly adapted to be attached to a vehicle and operable from the interior thereof.

In the prior art it is of course known that some form of light must generally be directed upon an object to be photographed. Often the source of illumination is mounted in such a way that it may be conveniently aimed or handled along with the camera. One example of this general type of construction is shown in U.S. Pat. No. 2,479,916, issued to A. Bensen on Aug. 23, 1949. The latter reference discloses a camera and an associated illumination lamp mounted on a hand held frame.

There have also been attempts in the prior art to mount cameras to automobiles to facilitate vehicular photography. For example, U.S. Pat. No. 3,833,196, issued Sept. 3, 1974, discloses a camera support whereby a camera may be selectively secured to a vehicular window. U.S. Pat. No. 2,856,149, issued Oct. 14, 1958 to R. Lehder discloses an automobile camera support adapted to be attached to the upper frame portion of a vehicle. U.S. Pat. No. 3,176,602, issued Apr. 6, 1965 to L. Wilt discloses a bracket for mounting a movie camera to the dash of an automobile. Another form of camera mounting structure is shown in U.S. Pat. No. 2,907,253, issued to D. McDonald on Oct. 6, 1959. In the latter reference a camera is mounted to the dash of an automobile in order to simultaneously photograph a speeding vehicle and a radar-controlled meter indication of the speeding vehicle's velocity.

With prior art mounting brackets which rigidly attach cameras interiorly of a vehicle it is difficult to aim the camera where moving objects are to be photographed. When a camera is mounted internally of a vehicle, reflective or refractive distortion caused by the windshield (or other glass panels) can deleteriously affect picture quality. Of course, in this regard, the often dirty windshield associated with a vehicle will be a great disadvantage. On the other hand, if a camera is mounted externally of the vehicle it may be difficult or nearly impossible to precisely aim and control it.

SUMMARY OF THE INVENTION

The present invention comprises a combined camera and spotlight assembly adapted to be employed in conjunction with a vehicle, and operable to illuminate and photograph an object through remote control from the vehicle interior.

In a preferred form of this invention the apparatus comprises a housing which is adapted to be attached to the vehicle roof, and which surrounds an orifice provided in the roof to mount the apparatus. Importantly, the spotlight and camera are operable from the vehicle interior via a handle and linkage member which extends into the vehicle and which may be manually grasped by the vehicle driver. In this manner the camera and spotlight will be operated simultaneously, so that by illuminating an object with a spotlight, for example, it may be simultaneously photographed with the associated camera. Moreover, through the latter construction the camera will be heated by heat escaping from the interior of the vehicle to prevent cold weather clogging or film deterioration.

In an important alternative embodiment of this invention the camera and spotlight are combined in a unit which is externally mounted to the vehicle door post by linkage which extends through to the vehicle interior. The apparatus may be actuated through a pistol grip assembly, which includes manually actuable film advance mechanism and shutter-trip mechanism controls, along with a conventional electrical switch for selectively energizing the spotlight. By simply directing light upon an object to be photographed with the spotlight, the camera will be appropriately aimed for simultaneous picture taking.

Thus an important object of this invention is to provide a combined vehicular spotlight and camera assembly.

A similar object of this invention is to provide a vehicular spotlight and camera assembly which is adapted to be externally mounted on a vehicle, while being completely controllable from the vehicular interior.

Yet another object of this invention is to provide a vehicle with an externally operable camera assembly adapted to be aimed and operated without the necessity of optical aiming by the operator. It is an important feature of the instant invention that the camera will be properly aimed simply by directing the spotlight upon the object to be photographed.

Still another object of this invention is to provide a combined vehicle spotlight and camera assembly of the character described which may be completely operated from the interior of the vehicle.

Yet another object of this invention is to provide an externally mounted vehicular camera assembly which will be extremely resistant to cold weather freeze up. It is an important feature of a preferred embodiment of this invention that heat generated internally of the automobile will be available for warming the photographic apparatus to prevent cold weather freeze up of same.

Another object of this invention is to provide a vehicular camera system ideally adapted for nighttime use.

These and other objects and advantages of this invention, along with features of novelty appurtenant thereto, will appear or become apparent in the course of the following description.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 1 is a perspective view illustrating a form of my combined vehicular camera and spotlight assembly operatively installed on a conventional vehicle;

FIG. 2 is a longitudinal sectional view of the combined vehicular camera and spotlight assembly taken generally along line 2—2 in FIG. 1, with parts thereof broken away or shown in section for clarity;

FIG. 3 is an abbreviated, perspective view of an alternative embodiment of this invention, in which a combined vehicular camera and spotlight assembly is mounted through the frame door post of a vehicle;

FIG. 4 is an enlarged view of the invention shown in FIG. 3, with parts thereof shown in section or broken away for clarity; and FIG. 5 is a sectional view taken along line 5—5 in FIG. 4.

DETAILED DESCRIPTION OF THE DRAWINGS

In FIG. 1 there is illustrated a conventional automobile 10 including a roof 11 on which the instant invention has been operatively mounted. It should be understood that the invention may be employed successfully with any of a wide variety of vehicles, including boats, aircraft and the like.

The combined spotlight and camera assembly 12 is adapted to be roof mounted and is operable from the interior of the vehicle through an aperture 14 provided in roof 11. The apparatus 12 comprises a generally cylindrical housing 16 which is externally attached to roof 11 by mounting plate 17. Gaskets 18 seal the apparatus to prevent leakage through aperture 14. A translucent, generally concave front lens covering 20 is fastened to housing 16 at the front thereof by circumferential flange 22. The circumferential gasket 23 provides a weatherproof seal between lens 20 and housing 16. The interior of housing 16 is in communication with the vehicle interior 24 through aperture 14. Additionally, the interior of the housing 16 may be reached from outside the vehicle through a hinged door 26 which is attached to housing 16 and selectively secured thereto via a knurled nut 27.

A camera 30 and associated spotlight assembly 32 are disposed interiorly of housing 16. Camera assembly 30 comprises a generally cubical housing 34 and a forward mounted, conventional zoom lens assembly 36. The spotlight assembly 32 comprises a housing 38 having an integral, angled portion 40 thereof which extends into the vehicle interior. A pistol grip assembly 42 for manually controlling the apparatus includes an elongated rod portion 44 which extends through housing portion 40 and is attached to concave spotlight lens housing 46 through a pivot 45. Spotlight housing 46 is pivotally attached to frame housing 38 through a clevis 47 and pivot 47a, and includes a front lens portion 48 attached thereto by flange 51.

Thus the spotlight may be aimed upwardly or downwardly independently of camera assembly 30 by grasping handgrip 52 and sliding rod 44 axially within frame portion 40. The spotlight assembly of course includes a conventional incandescent bulb (not shown) disposed within housing 46 and electrically operated through power supplied from electrical input leads 54. The spotlight is actuated by manipulating an S.P.S.T. switch 43 (FIG. 2) which switches electric current supplied via cables 54 to the spotlight bulb.

Camera 34 is preferably mechanically fastened to spotlight frame housing 38 by a plurality of mounting bolts 56. A downwardly projecting, generally U-shaped support bracket 57 is pivotally secured to housing 38 by a pair of studs 58, thereby enabling the vehicle operator to simultaneously aim the combined assembly in a vertical plane (upwardly or downwardly as viewed in FIG. 2) by simply manually tilting handgrip 52. A stud 60 revolvably secures U-bracket 57 to an upper mounting plate 61 secured to housing 16 enabling the operator to selectively direct the apparatus in a horizontal plane by moving handgrip 52 sideways. Thus the apparatus may be aimed generally within the full field of view perceivable by the vehicle driver through windshield 13. Of course, it will be appreciated that where an object to be photographed moves out of the field of view the vehicle itself may have to be moved appropriately.

In the preferred embodiment the camera 34 will actually comprise a motor driven movie camera. Appropriate models are available from the Bolex Company. The camera is adapted to employ Super 8 or 16 mm. film. The camera motor 64 within housing 65 is controllable through a trigger switch 66 associated with handgrip 52. The handgrip apparatus 42 and associated switches are of conventional construction, associated with the camera. When the trigger switch is pulled halfway back single frames of film may be exposed, and when fully depressed motor 64 will continuously advance film so movies may be taken. The zoom lens 36 is conventionally controllable through a thumb operated zoom lens control switch 68 associated with pistol grip 52. Normally the zoom lens will be focused at infinity so that ordinarily adjustments to focus will not be necessary. Power for operating the motor 64 and the zoom lens is available from conductor input wires 54, and conventionally wired.

Thus, where an object is to be photograhed from the vehicle 10, the vehicle will first be swung into a position pointing generally at the target object. Subsequently the spotlight will be energized by turning switch 43 to the "on" position and will be aimed by manipulating the handgrip assembly 42 in order to illuminate the object to be photographed. When the object is thereby illuminated, photographs may be taken by depressing switch 66 to activate camera 34. As the target moves through the field of view the entire assembly may be pivoted through either horizontal or vertical planes about pivots 60 and 58 respectively. It will be apparent that with the construction disclosed heat from the interior of the vehicle will rise upwardly through aperture 14 and maintain the apparatus disposed therewithin at a convenient operation temperature.

An alternative embodiment 80 (FIGS. 3 through 5) includes a spotlight assembly 82 and an associated, remotely controllable camera assembly 84. The assembly 80 is adapted to be attached to a vehicle 86 through the vehicle door post 87 in a conventional fashion. Assembly 80 will thus be positioned externally of the vehicle in a position just forward to and immediately adjacent to the vehicle driver. As in the case of the previously described embodiment, the apparatus 80 is adapted to photograph an object after being aimed with the spotlight associated therewith.

The spotlight 82 includes a concave housing 88 having a translucent external lens 90 fastened thereto with a flange 92. A conventional incandescent bulb 94 disposed internally of housing 88 generates light in a conventional manner, which is directed outwardly through lens 90 by the conventional silvered interior of housing 88. A cylindrical portion 96 integral with housing 88 is revolvably pivotally attached to a tubular stem portion 98 which extends through vehicle door post 87 and terminates in a hand grip assembly 100. A mounting plate 102 secured to the vehicle through mounting bolts 104 secures the spotlight in an operative position on the vehicle door post 87. The apparatus 80 may be manipulated much like a conventional spotlight, in that it may be aimed in a generally horizontal plane by twisting the pistol grip handle member 104 as indicated by directional arrow 106, or it may be vertically manipulated by rotating the handle grip 104 in the direction shown generally by arrow 110. To the latter effect the mounting tube or sleeve 98 is rotatably received within doorpost 87, and conventional linkage (not shown) rotates spotlight 88 with respect to sleeve member 98.

The camera assembly 84 includes an externally defined housing 122 which is secured to spotlight housing 88 by screws 123. The housing assembly seals and protects the conventional, preferably 35 mm. camera 126 disposed therewithin. A translucent shield 128 at the forward end of housing 122 protects camera lens 129. Camera lens 129 will normally be maintained in the "infinity" position. A generally L-shaped mounting bracket 130 attached internally of housing 122 to the rear thereof includes a horizontally projecting portion 131 to which camera 126 is rigidly secured and mounted by a knurled mounting nut 134.

The camera shutter mechanism may be operated from the interior of the vehicle 86 by a shutter release button 136, which communicates with the shutter mechanism 138 through a cable 140 which passes within sleeve 98 and upwardly to camera housing 122 through a cable sheath 146 which enters housing 122 through a grommet 147. Thus, where desired to take a picture the operator need merely depress pushbutton 136. After taking a picture film may be advanced by manipulating trigger 150, which is pivotally attached to the upper portion of handgrip 104 by a screw 151, and which is attached to a control cable 152 at a pivot point 154. Cable 152 also extends through sleeve 98 and through sheath 146 into camera housing 122, where it is attached to a conventional film advance lever mechanism 158. Thus, as the operator pulls back on trigger 150 with his forefinger the conventional spring loaded film advance will be moved clockwise (as viewed in FIG. 5) and when the operator releases trigger 150 the mechanism will return to its normal position. In this manner film may be advanced within the camera from an operator position interiorly of the automobile.

Thus to operate the apparatus 80 the vehicle driver need merely aim at an object to be photographed by twisting and manipulating the pistol handgrip member 104 in either of the directions 106 or 110. When a target object to be photographed has been suitably illuminated by the spotlight 82, the camera 126 will be aimed appropriately so that merely by manipulating switch 136 a photograph of the illuminated object may be taken. In the majority of circumstances the camera will be appropriately focused simply by leaving it within the "infinity" position. However, where it is necessary to take pictures from a closer position, it will be desirable to employ a camera having an automatic focus feature.

Thus, in both embodiments described, the camera and spotlight assembly may be manipulated by the user from the interior of the vehicle on which it is mounted. Importantly, once an object to be photographed is sighted generally by the vehicle driver, he need merely aim the associated spotlight at the object to insure that the camera is appropriately aimed. Thereafter, by simply manipulating the previously mentioned controls from within the vehicle interior, suitable pictures will be obtained without leaving the vehicle or sighting the camera.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A combined spotlight and camera assembly mounted on a vehicle, said assembly comprising:
   a spotlight for illuminating a subject to be photographed, said spotlight being supported externally of a vehicle on mounting means for pivotal movement horizontally and vertically;
   a camera for photographing a subject, said camera being connected to said spotlight and mechanically movable therewith on said mounting means;
   an extension of said mounting means projecting inside the vehicle and having a hand gripping segment thereon, said hand grip segment being manipulable inside the vehicle to simultaneously aim said spotlight, and said camera therewith, towards a subject of pivotal movement on said mounting means, whereby said camera may be utilized to photograph a subject after being directed to the subject with the spotlight to which it is connected; and
   means for actuating said camera mounted on said extension within the vehicle.

2. Apparatus as defined in claim 1 wherein:
   a lens focusing actuator is positioned on said hand grip segment inside of the vehicle and operatively associated with a focusing adjustment on the lens of said camera, whereby the focus of the camera may be adjusted inside the vehicle.

3. Apparatus as defined in claim 2 wherein:
   said camera is equipped with an electrically operable zoom lens and said actuator is a control switch in the electrical power supply to said lens.

4. Apparatus as defined in claim 1 wherein:
   a switch to operate said spotlight is mounted inside the vehicle on said extension of said mounting means.

5. Apparatus as defined in claim 1 wherein:
   said spotlight and said camera are housed within a common enclosure attached to the vehicle roof in surrounding relation to a aperture therein through which heated air may circulate into said enclosure from the interior of the vehicle to keep said camera at a warm temperature for satisfactory operation, said mounting means is affixed to said enclosure, and said mounting means extension projects inside the vehicle through said aperture.

6. Apparatus as defined in claim 5 wherein:
   said spotlight is pivotally movable independently of said camera about a horizontal axis, and an elongated connector extends between said spotlight and said hand grip segment, whereby said hand grip segment may also be manipulated back and forth to impart linear movement to said elongated connector for independent pivotal movement of said spotlight.

7. Apparatus as defined in claim 6 wherein:
   said extension of said mounting means angles downwardly into the interior of said vehicle and said elongated connector extends through said extension.

8. The combination as defined in claim 1 wherein said camera comprises a movie camera and said camera actuating means comprises a trigger on said hand grip segment adapted to be manually manipulated for operating said movie camera.

* * * * *

UNITED STATES PATENT AND TRADEMARK OFFICE
CERTIFICATE OF CORRECTION

PATENT NO. : 4,063,258
DATED : December 13, 1977
INVENTOR(S) : Robert H. Allen

It is certified that error appears in the above-identified patent and that said Letters Patent are hereby corrected as shown below:

In claim 1, line 19, change "of" before "pivotal" to --by--.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*